(12) United States Patent
Sobieski et al.

(10) Patent No.: US 8,714,650 B2
(45) Date of Patent: May 6, 2014

(54) SEAT ASSEMBLY HAVING A MOVEABLE HEAD RESTRAINT ASSEMBLY

(75) Inventors: Zdzislaw Sobieski, Eching (DE);
Karsten Mueller, Ingolstadt (DE);
Ralph Fey, Zirndorf (DE)

(73) Assignee: Lear Corporation, Southfield, MI (US)

( * ) Notice: Subject to any disclaimer, the term of this patent is extended or adjusted under 35 U.S.C. 154(b) by 2855 days.

(21) Appl. No.: 12/750,184

(22) Filed: Mar. 30, 2010

(65) Prior Publication Data
US 2010/0301654 A1 Dec. 2, 2010

Related U.S. Application Data

(60) Provisional application No. 61/181,744, filed on May 28, 2009, provisional application No. 61/300,228, filed on Feb. 1, 2010.

(30) Foreign Application Priority Data

Mar. 3, 2010 (DE) .......................... 10 2010 002 525

(51) Int. Cl.
*A47C 7/36* (2006.01)

(52) U.S. Cl.
USPC .......................................... 297/391; 297/404

(58) Field of Classification Search
USPC ................................. 297/391, 404
See application file for complete search history.

(56) References Cited

U.S. PATENT DOCUMENTS

| | | | |
|---|---|---|---|
| 4,265,482 A | 5/1981 | Nishimura et al. | |
| 4,640,549 A * | 2/1987 | Yokota | 297/408 |
| 4,674,797 A | 6/1987 | Tateyama | |
| 4,856,848 A * | 8/1989 | O'Sullivan et al. | 297/391 |
| 6,082,817 A | 7/2000 | Mueller | |
| 6,149,233 A * | 11/2000 | Takei et al. | 297/220 X |
| 6,390,558 B2 | 5/2002 | Fischer et al. | |
| 6,688,697 B2 | 2/2004 | Baumann et al. | |
| 6,715,829 B2 | 4/2004 | Svantesson et al. | |
| 6,767,064 B2 | 7/2004 | Veine et al. | |
| 6,805,411 B2 | 10/2004 | Gramss et al. | |
| 6,899,395 B2 | 5/2005 | Yetukuri et al. | |
| 7,048,336 B2 | 5/2006 | Mawbey et al. | |
| 7,070,235 B2 | 7/2006 | Schilling et al. | |
| 7,073,863 B1 | 7/2006 | Low et al. | |
| 7,111,901 B2 | 9/2006 | Schlierf et al. | |
| 7,137,668 B2 | 11/2006 | Kreitler | |

(Continued)

FOREIGN PATENT DOCUMENTS

| | | |
|---|---|---|
| CN | 1799901 A | 7/2006 |
| DE | 102004005695 A1 | 8/2004 |

(Continued)

OTHER PUBLICATIONS

German Patent & Trademark Office, Office Action for the corresponding German Patent Application No. 101 10 289.5 mailed Jan. 14, 2011.

*Primary Examiner* — Anthony D Barfield
(74) *Attorney, Agent, or Firm* — Brooks Kushman P.C.

(57) ABSTRACT

A seat assembly having a seat back and a head restraint assembly disposed on the seat back. The head restraint assembly includes a support post and a headrest disposed on the support post. The headrest is inhibited from moving away from a head of a seat occupant until the headrest is actuated toward the head of the seat occupant.

20 Claims, 7 Drawing Sheets

(56) References Cited

U.S. PATENT DOCUMENTS

| | | |
|---|---|---|
| 7,195,313 B2 | 3/2007 | Hippel et al. |
| 7,232,187 B1 | 6/2007 | Sundararajan et al. |
| 7,455,363 B2 * | 11/2008 | Chung ............................ 297/391 |
| 7,631,932 B2 | 12/2009 | Hoffmann |
| 7,677,658 B2 * | 3/2010 | Choi ............................ 297/404 |
| 2001/0028191 A1 | 10/2001 | Lance |
| 2001/0040396 A1 | 11/2001 | Kreuels et al. |
| 2004/0195894 A1 | 10/2004 | Pal et al. |
| 2005/0077762 A1 | 4/2005 | Kraemer et al. |
| 2005/0116515 A1 | 6/2005 | Schlierf et al. |
| 2006/0071518 A1 | 4/2006 | Hippel et al. |
| 2006/0119150 A1 | 6/2006 | Hoffmann |
| 2006/0226688 A1 | 10/2006 | Terada et al. |
| 2007/0216211 A1 | 9/2007 | Mori |
| 2009/0058162 A1 | 3/2009 | Boes et al. |
| 2009/0146479 A1 | 6/2009 | Boes et al. |

FOREIGN PATENT DOCUMENTS

| | | |
|---|---|---|
| DE | 102006015785 A1 | 10/2006 |
| FR | 2852066 A1 | 9/2004 |
| GB | 2340744 A | 3/2000 |
| WO | 2004089688 A1 | 10/2004 |
| WO | 2007073034 A1 | 6/2007 |

* cited by examiner

SEAT ASSEMBLY HAVING A MOVEABLE HEAD RESTRAINT ASSEMBLY

CROSS-REFERENCE TO RELATED APPLICATIONS

This application claims the benefit of U.S. provisional application Ser. No. 61/181,744 filed May 28, 2009 and U.S. provisional application Ser. No. 61/300,228 filed Feb. 1, 2010. This application also claims foreign priority benefits under 35 U.S.C. §119(a)-(d) to DE 10 2010 002 525.9, filed Mar. 3, 2010, which are hereby incorporated by reference in their entirety.

BACKGROUND OF THE INVENTION

Field of the Invention

The present invention relates to a seat assembly having a moveable head restraint assembly.

SUMMARY OF THE INVENTION

In at least one embodiment, a seat assembly is provided. The seat assembly includes a seat back and a head restraint assembly disposed on the seat back. The head restraint assembly includes a support post and a headrest disposed on the support post. The headrest is inhibited from moving away from a head of a seat occupant until the headrest is actuated toward the head of the seat occupant.

In at least one embodiment, a seat assembly is provided. The seat assembly includes a seat back and a head restraint assembly disposed on the seat back. The head restraint assembly includes a support post and a headrest disposed on the support post. The headrest is inhibited from moving along an axis in a first direction until the headrest is moved along the axis in a second direction disposed opposite the first direction to release a latching mechanism.

In at least one embodiment, a seat assembly is provided. The seat assembly includes a seat back, a support post extending from the seat back, and a headrest. The headrest is configured to move with respect to the support post in a first direction and a second direction disposed opposite the first direction. The headrest includes first and second housings, an engagement member, and a latching mechanism. The engagement member extends from the first housing to the second housing and has a set of notches. The latching mechanism has a latch and a lock device. The latch engages a member of the set of notches to inhibit movement of the headrest in the first direction. The lock device engages the latch to permit movement of the headrest in the first direction.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily drawn to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
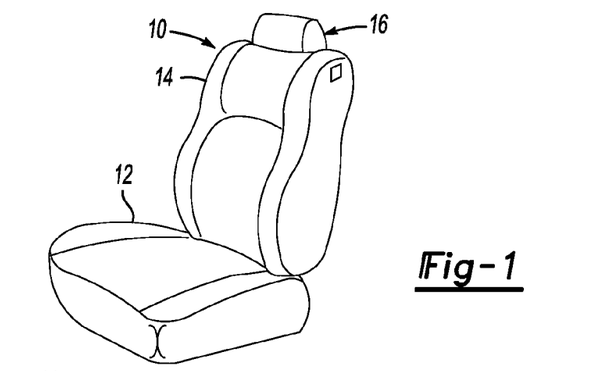
FIG. 1 is a perspective view of a seat assembly having a head restraint assembly.

Referring to FIG. 1, an exemplary seat assembly 10 is shown. The seat assembly 10 may be configured for use in a vehicle, such as a motor vehicle like a car or truck.

The seat assembly 10 may include a seat bottom 12 and a seat back 14. In a vehicular application, the seat bottom 12 may be configured to be mounted on a support surface, such as a floor pan of a vehicle. The seat bottom 12 may be configured to support a seat occupant. The seat back 14 may be pivotally disposed on the seat bottom 12 and may include a head restraint assembly 16. The seat back 14 may be configured to support the back of a seat occupant.

Figure 2:
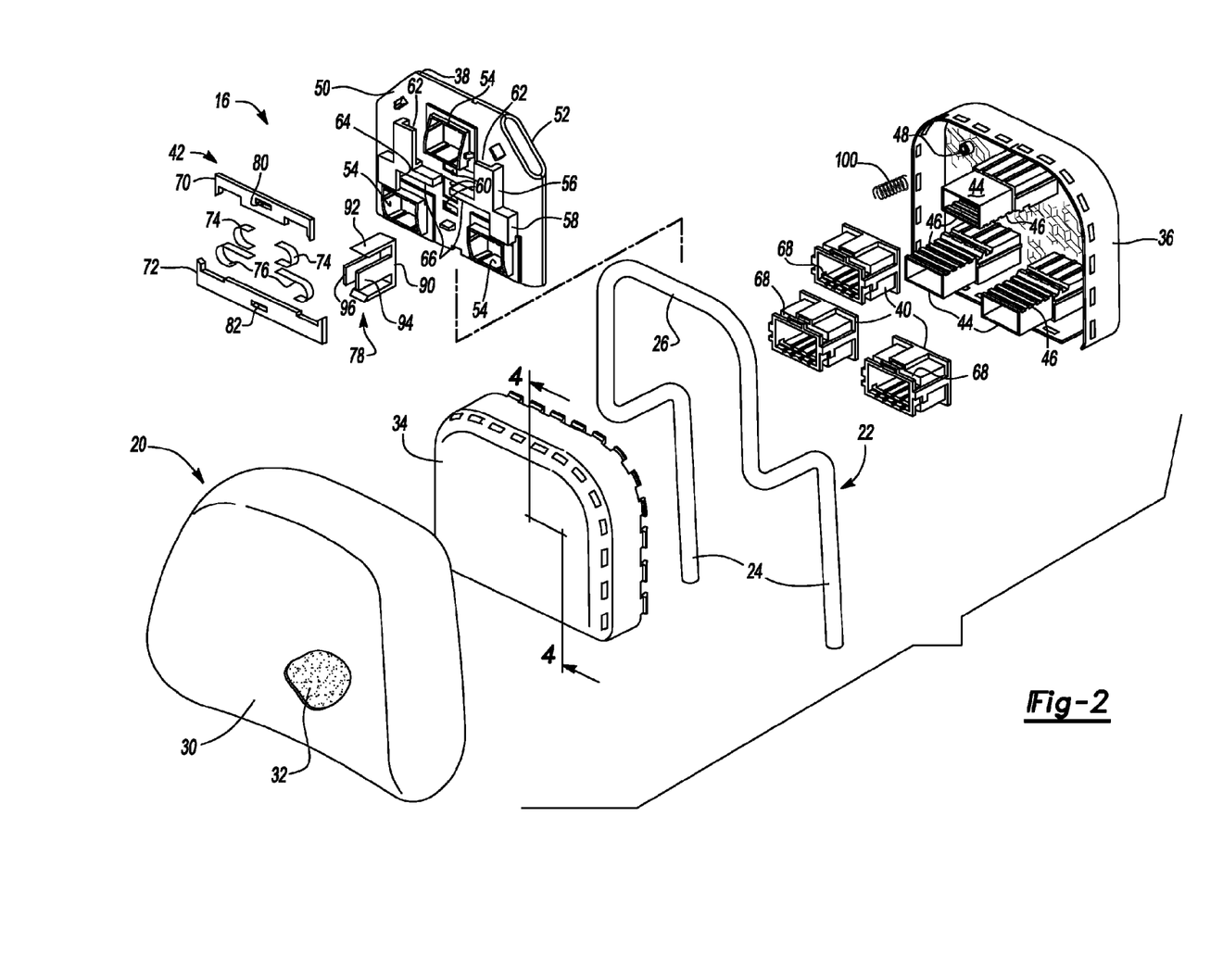
FIG. 2 is an exploded view of an embodiment of the head restraint assembly.
Figure 3:
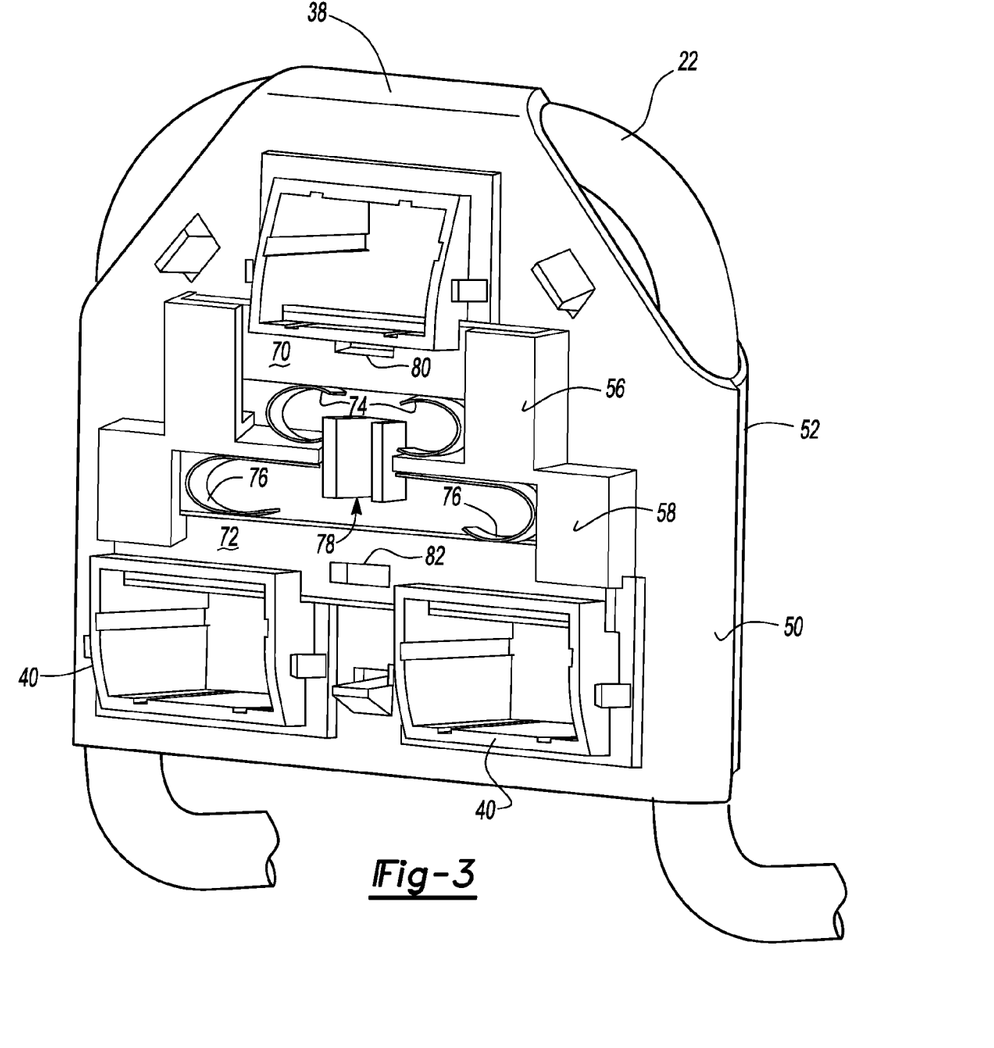
FIG. 3 is a fragmentary perspective view showing a portion of the head restraint assembly.

Referring to FIGS. 2 and 3, an embodiment of the head restraint assembly 16 is shown in more detail. The head restraint assembly 16 may include a headrest 20 and one or more support posts 22. The headrest 20 may be moveably disposed on the support posts 22 as will be described in more detail below. The support posts 22 may be disposed on the seat back 14 and may be made of any suitable material or materials, such as a metal or metal alloy. The support posts 22 may include a lower portion 24 and an upper portion 26.

The lower portion 24 may extend through the top of the seat back 14. In addition, the lower portion 24 may move with respect to the seat back 14 in one or more embodiments. For instance, the lower portion 24 may be disposed in a guide sleeve that may be disposed on the frame of the seat back 14 or may be part of an active head restraint system that is configured to move in response to a load force or vehicle impact event. Alternatively, the lower portion 24 may be fixedly mounted to a structural frame of the seat back 14 such that the support posts 22 do not move with respect to the seat back 14.

The upper portion 26 may or may not be coaxially disposed with the lower portion 24. In addition, the upper portion 26 may be integrally formed with the lower portion 24. In the embodiment shown in FIG. 2, the upper portion 26 is generally U-shaped and extends between two lower portions 24 of the support post 22. The upper portion 26 may be primarily disposed inside the headrest 20 and may be disposed closer to the head of a seat occupant than a part of the lower portion 24 that extends toward the seat back 14.

The headrest 20 may be configured to support the head of an occupant of the seat assembly 10. The headrest 20 may be generally be disposed above the seat back 14 and may include a trim cover 30, a cushion 32, a first housing 34, a second housing 36, a mounting unit 38, one or more sleeves 40, and a latching mechanism 42.

The trim cover 30 may cover at least a portion of a visible exterior surface of the headrest 20 and may be engaged by a seat occupant. The trim cover 30 may be made of any suitable material or materials, such as a fabric, vinyl, leather, or the like. The trim cover 30 may cover the cushion 32, which may be disposed under at least a portion of the trim cover 30.

The first and second housings 34, 36 may be disposed under the trim cover 30 and/or cushion 32. The first and second housings 34, 36 may be made of any suitable material or materials, such as a polymeric material. The first and second housings 34, 36 may each have openings that face toward each other and cooperate to define a cavity that at least partially receives the mounting unit 38, sleeves 40, and latching mechanism 42. The first and second housings 34, 36 may be fastened or connected to each other in any suitable manner. For instance, the first and second housings 34, 36 may snap fit together using one or more locking tabs that engage corresponding slots on the other housing.

The first and second housings 34, 36 may also include one or more engagement members 44. An engagement member 44 may have any suitable configuration. For instance, an engagement member 44 may have a male configuration that fits inside a sleeve 40, a female configuration that may be disposed outside the sleeve 40, or combinations thereof. In FIG. 2, three engagement members 44 are provided that extend from the second housing 36 and may be engage or be received by the first housing 34. Alternatively, one or more engagement members 44 could be provided on the first housing 34 and extend toward the second housing 36. An end of each engagement member 44 may mate with a mating feature on the opposite housing to help interlock the housings 34, 36 together.

Each engagement member 44 may include a set of notches 46. The notches 46 may be spaced apart from each other and may extend generally parallel to each other in one or more embodiments to provide a plurality of discrete locking positions for the headrest 20 as will be described in more detail below. Any suitable number of notches 46 may be provided. In the embodiment shown, five notches 46 are provided. The notches 46 may be provided with an angled or ramp surface that permits ratchet-like operation as will be discussed in more detail below.

The second housing 36 may also include a biasing member mounting feature 48 that engages a housing biasing member as will be discussed in more detail below.

The mounting unit 38 may be fixedly disposed on the support post 22. The mounting unit 38 may be provided as a single component or as multiple components. For instance, the mounting unit 38 may include a first mounting plate 50 and a second mounting plate 52 that may be attached or fastened to each other in any suitable manner, such as with one or more fasteners or interlocking features like a snap tab. In addition, the first and second mounting plates 50, 52 may be provided as a unitary structure in one or more embodiments. The mounting unit 38 may at least partially define a cavity into which the support post 22 extends. In addition, the mounting unit 38 may include one or more sleeve openings 54, one or more first latch mounting features 56, one or more second latch mounting features 58, and one or more lock openings 60.

A sleeve opening 54 may be provided in the first and/or second mounting plates 50, 52. In FIG. 2, three sets of sleeve openings 54 are shown. A sleeve opening 54 may receive a sleeve 40 and help inhibit movement of the sleeve 40 through the sleeve opening 54. The sleeve openings 54 may be generally disposed inside an area defined by the upper portion 26 of the support post 22 to provide a compact headrest design.

One or more first latch mounting features 56 may be configured to moveably receive a portion of the latching mechanism 42. In the embodiment shown, two first latch mounting features 56 that may be spaced apart from each other are provided on the first mounting plate 50. Alternatively, the first latch mounting features 56 may be provided on the second mounting plate 52 in one or more embodiments. The first latch mounting features 56 may be disposed near a sleeve opening 54. The first latch mounting features 56 may extend outwardly from an exterior surface of the mounting unit 38 and may define a slot 62 that receives a portion of the latching mechanism 42.

One or more second latch mounting features 58 may be configured to moveably receive a portion of the latching mechanism 42. In the embodiment shown, two second latch mounting features 58 that may be spaced apart from each other are provided on the first mounting plate 50. Alternatively, the second latch mounting features 58 may be provided on the second mounting plate 52 in one or more embodiments. The second latch mounting features 58 may be disposed near a sleeve opening 54 below the first latch mounting feature 56. The second latch mounting features 58 may extend outwardly from an exterior surface of the mounting unit 38 and may define a slot 64 that receives a portion of the latching mechanism 42. The slots 62, 64 in the first and second latch mounting features 56, 58 may be oriented or extend in opposite directions.

One or more lock openings 60 may also be configured to moveably receive a portion of the latching mechanism 42. The lock opening 60 may be provided on and extend through the first and second mounting plates 50, 52. The lock opening 60 may be disposed near the center of the mounting unit 38. For example, the lock opening 60 may be disposed between the first and/or second latch mounting features 56, 58 and/or between one or more sleeve openings 54. One or more lock openings 60 may also be disposed proximate a divider wall 66 that may extend from an exterior surface of the mounting unit 38 and may be generally disposed between the first and second latch mounting features 56, 58.

One or more sleeves 40 may cooperate with the mounting unit 38 to help facilitate operation of the latching mechanism 42. In the embodiment shown, three sleeves 40 are provided. Each sleeve 40 may have an opening 68 that may be configured to receive a portion of the latching mechanism 42 as will be described in more detail below. The sleeves 40 may be fixedly mounted on the mounting unit 38. For example, each sleeve 40 may include a first end and a second end disposed opposite the first end that may be adapted to secure the sleeve 40 to the first and second mounting plates 50, 52 respectively. In at least one embodiment, the first end may include one or more fastening features, such as a slot and/or a locking tab that engages the first mounting plate 50, and the second end may have a flange that engages the second mounting plate 52.

The latching mechanism 42 may be configured to selectively permit or inhibit movement of the headrest 20 (e.g., first and second housings 34, 36) with respect to the support post 22. The latching mechanism 42 may include a first latch 70, a second latch 72, one or more first latch biasing members 74, one or more second latch biasing members 76, and a lock device 78. The latching mechanism 42 may be configured with a single latch and associated biasing member in one or more embodiments.

The first latch 70 may be moveably disposed on the mounting unit 38. More specifically, the first latch 70 may be moveably disposed in the slot 62 in the first latch mounting feature 56 and may be configured to move toward or away from an engagement member 44 to engage or disengage a notch 46. As such, the first latch 70 may engage or mate with a notch 46 to inhibit movement of the headrest 20 in at least one direction and may be spaced apart from the notch 46 to permit movement. The first latch 70 may have any suitable configuration for engagement or mating with a notch 46. For example, the first latch 70 may be generally configured as an elongated bar. In addition, the first latch 70 may include a first hole 80 that may be configured to receive a portion of the lock device 78 as will be described in more detail below.

The second latch 72 may also be moveably disposed on the mounting unit 38. More specifically, the second latch 72 may be moveably disposed in the slot 64 in the second latch mounting feature 58 and may be configured to move toward or away from an engagement member 44 to engage or disengage a notch 46. As such, the second latch 72 may engage or mate with a notch 46 to inhibit movement of the headrest 20 in at least one direction and may be spaced apart from the notch 46 to permit movement. The second latch 72 may have any suitable configuration for engagement or mating with a notch 46. For example, the second latch 72 may be generally configured as an elongated bar. In addition, the second latch 72 may be configured to engage a different engagement member 44, and therefore different notches 46, than the first latch 70. In addition, the second latch 72 may be longer than the first latch 70 and may include a second hole 82 that may be configured to receive a portion of the lock device 78 as will be described in more detail below.

One or more first latch biasing members 74 may be provided to exert a biasing force on the first latch 70. For instance, the first latch biasing member 74 may bias the first latch 70 toward an engagement member 44. In the embodiment shown, a pair of first latch biasing members 74 is provided. The first latch biasing members 74 may have any suitable configuration. The first latch biasing members 74 may be configured as springs that are disposed against the divider wall 66 and the first latch 70. The first latch biasing members 74 may be disposed opposite each other and along opposing sides of the lock device 78.

One or more second latch biasing members 76 may be provided to exert a biasing force on the second latch 72. For instance, the second latch biasing member 76 may bias the second latch 72 toward an engagement member 44. In the embodiment shown, a pair of second latch biasing members 76 is provided. The second latch biasing members 76 may have any suitable configuration. The second latch biasing members 76 may be configured as springs that are disposed against the divider wall 66 and the second latch 72. The second latch biasing members 76 may be disposed opposite each other and along opposing sides of the lock device 78. In addition, the first and second latch biasing members 74, 76 may be disposed along opposite sides of the divider wall 66. Furthermore, a biasing member may be deleted or configured to engage and exert a biasing force on the first and second latches 70, 72 in one or more embodiments.

The lock device 78 may be configured to selectively permit or inhibit movement of the first and/or second latches 70, 72. For example, the lock device 78 may move between a locked position and an unlocked position. In the locked position, the lock device 78 may engage the first and/or second latches 70, 72 in a manner that inhibits movement. In the unlocked position, the lock device 78 may be disengage at least a portion of the first and/or second latches 70, 72 in a manner that permits movement. The lock device 78 may include a base 90, a first latch engagement arm 92, a second latch engagement arm 94, and one or more release arms 96.

The base 90 may be generally disposed between the mounting unit 38 and a housing, such as the second housing 36. In at least one embodiment, the base 90 may be engaged by the second housing 36 to move the lock device 78 within the lock opening 60 toward the first housing 34 as will be described in more detail below.

The first and second latch engagement arms 92, 94 may extend from the base 90 toward the first and second latches 70, 72, respectively. In at least one embodiment, the first and second latch engagement arms 92, 94 may be spaced apart from each other and extend in a generally parallel relationship through the lock opening 60 and toward the first housing 34. The first and second latch engagement arms 92, 94 may be received in the first and second holes 80, 82, respectively, when the lock device 78 is in the locked position and may be spaced apart from the first and second holes 80, 82, respectively, when the lock device 78 is in the unlocked position. In addition, the first and second latch engagement arms 92, 94 may be spaced apart from the first housing 34 when the lock device 78 is in the locked and unlocked positions. An engagement arm 92, 94 may be omitted in embodiments having one latch.

One or more release arms 96 may also extend from the base 90. In the embodiment shown, two release arms 96 are provided. The release arms 96 may be spaced apart from each other and extend in a generally parallel relationship through the lock opening 60 and toward the first housing 34. The release arms 96 may be longer than the first and second latch engagement arms 92, 94 and may be configured to engage the first housing 34 to move the lock device 78 from the locked position toward the unlocked position.

A housing biasing member 100 may be provided to exert a biasing force on the headrest 20. For instance, the housing biasing member 100 may bias the headrest 20 toward a retracted or rearward position. The housing biasing member 100 may be configured as a spring and may be provided in any suitable location. For example, the housing biasing member 100 may be provided between the mounting unit 38 and the second housing 36 and may be configured to push the second housing 36 away from the mounting unit 38. Alternatively, the housing biasing member 100 may be provided between the first housing 34 and the mounting unit 38 to pull the first housing 34 toward the mounting unit 38. The housing biasing member 100 may be disposed on the biasing member mounting feature 48 to position the housing biasing member 100 with respect to the second housing 36.

Referring to FIGS. 4-8, operation of the head restraint assembly 16 will be described in greater detail. For clarity, these figures do not show the headrest 20 in every possible position and omit the trim cover 30 and cushion 32. The head restraint assembly 16 may be configured such that the headrest 20 may move along an axis 102 with respect to the support post 22 in two directions. In a first direction 104, the headrest 20 may be moved toward the head of a seat occupant. In the second direction 106, the headrest 20 may be moved away from the head of a seat occupant. The headrest 20 may be inhibited from moving in the first direction 104 when the first and/or second latches 70, 72 engage a notch 46 in the engagement member 44.

Figure 4:
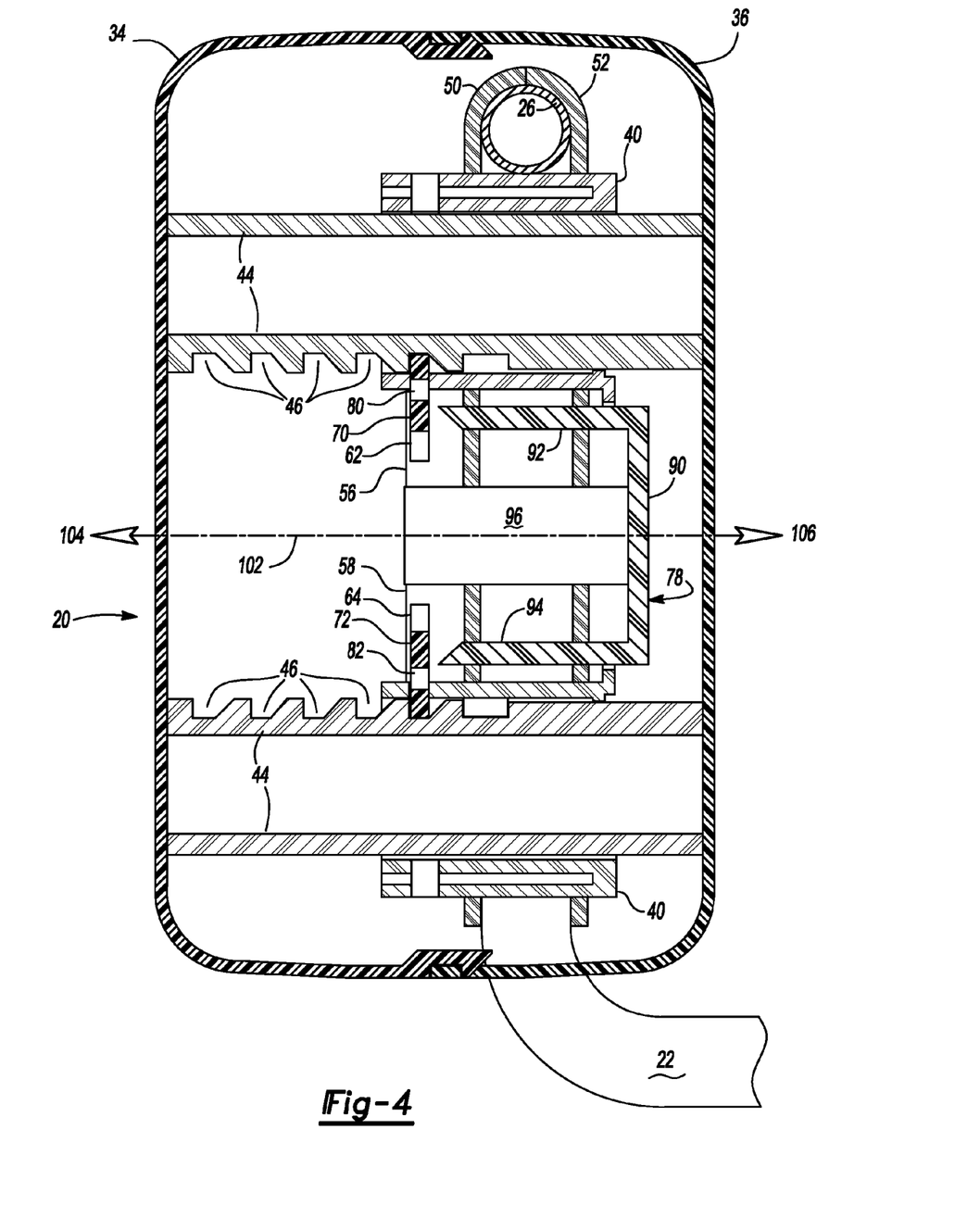
FIG. 4-8 are side section views of the head restraint assembly that illustrate operation of the head restraint assembly.

In FIG. 4, the headrest 20 is positioned in a forward position in which the headrest 20 is positioned toward the head of a seat occupant. The headrest 20 is inhibited in moving in the second direction 106 (i.e., toward the right in FIG. 4) due to the engagement between the first and second latches 70, 72 and notches 46 in at least one associated engagement member 44. The first and second latches 70, 72 are biased toward the notches 46 by the first and second latch biasing members 74, 76, respectively. In addition, the first and second latch engagement arms 92, 94 are not aligned with the first and second holes 80, 82, respectively.

Figure 5:
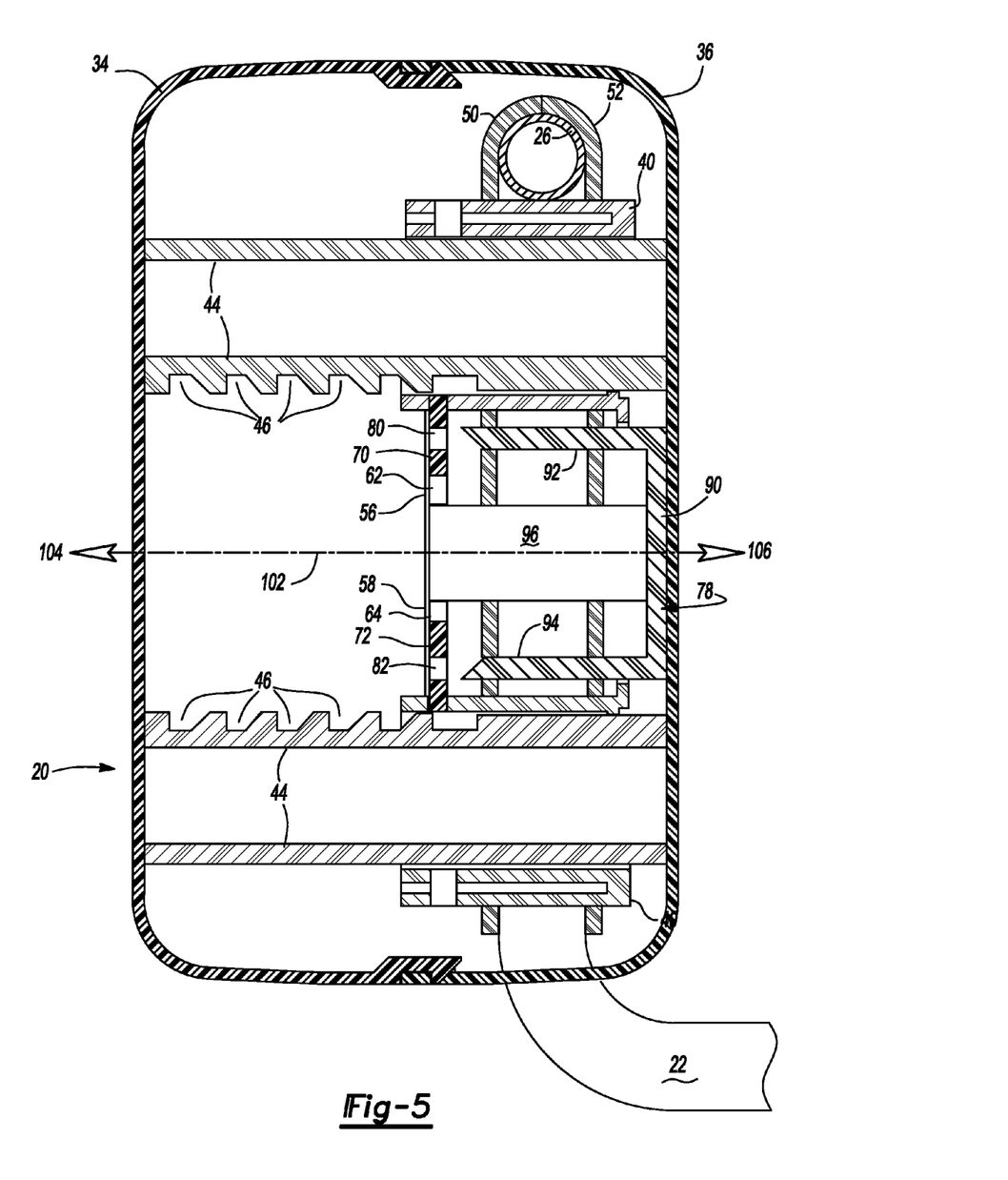

The headrest 20 may move from the position shown in FIG. 4 to the position shown in FIG. 5 due to the configuration of the notches 46. As the headrest 20 is moved in the first direction 104 (i.e., to the left in FIG. 4) from the position shown in FIG. 4 to the position in FIG. 5, the first and second latches 70, 72 slide along the ramp surface of the notch 46 when sufficient force is applied to the headrest 20 to overcome the biasing force exerted by the first and second latch biasing members 74, 76. As a result, the first and second latches 70, 72 move toward each other and the first and second holes 80, 82 align with the first and second latch engagement arms 92, 94, respectively. In addition, movement of the headrest 20 in the first direction 104 moves the lock device 78 toward the second housing 36 when the first and second latch engagement arms 92, 94 are not aligned with the first and second holes 80, 82, respectively.

Figure 6:
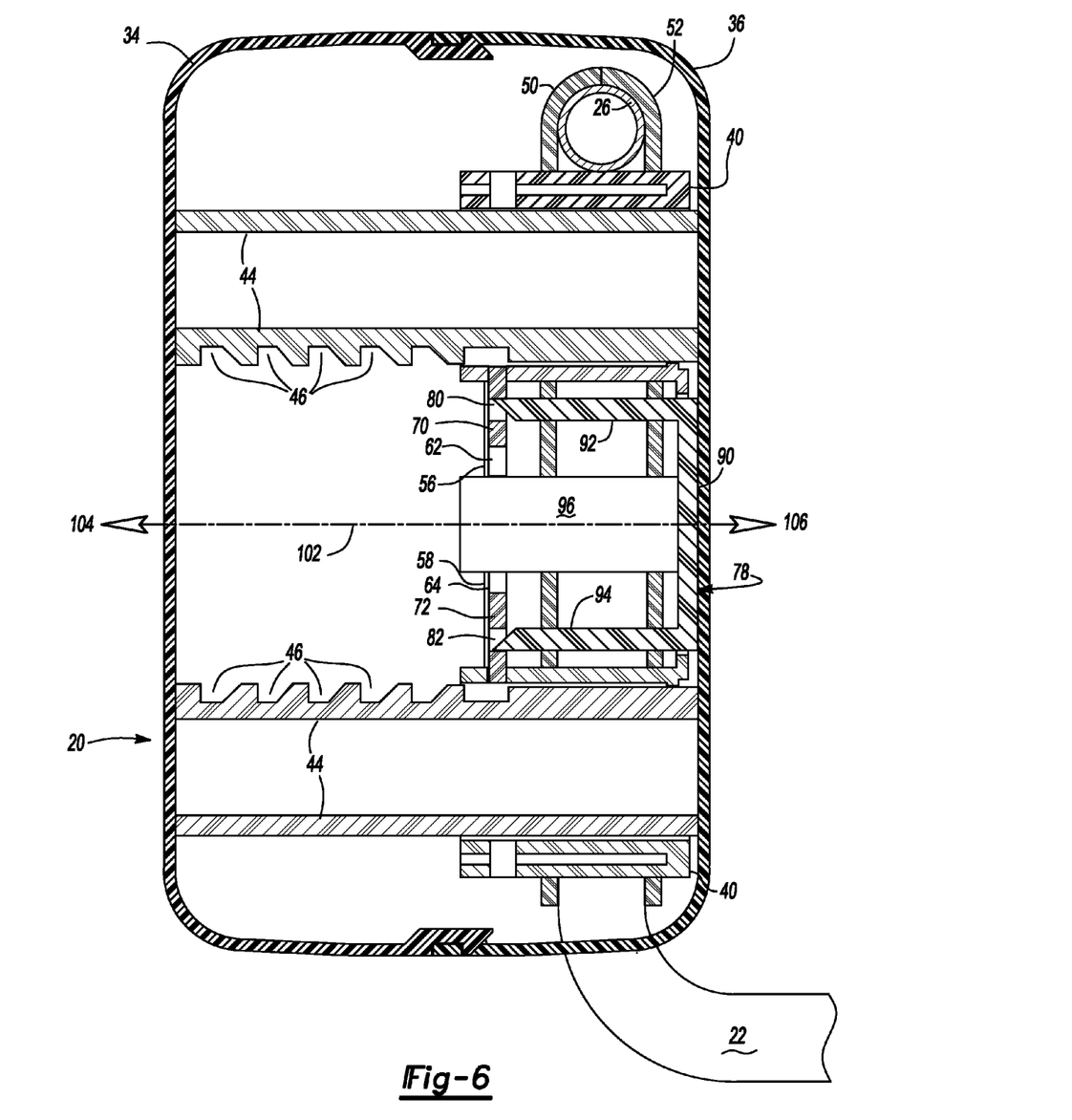

In FIGS. 5 and 6, the lock device 78 is restricted from moving in the second direction 106 due to engagement of the base 90 with the second housing 36. Movement of the headrest 20 in the first direction 104 from the position shown in FIG. 5 to the position shown in FIG. 6 causes the first and second latch engagement arms 92, 94 to enter the first and second holes 80, 82, respectively. As such, the lock device 78 is in the locked position and the first and second latch engagement arms 92, 94 hold the first and second latches 70, 72 in a retracted position in which the first and second latches 70, 72 are inhibited from engaging a notch 46. The headrest 20 is then free to move in the second direction 106 toward the position shown in FIG. 7 when sufficient force is applied to the headrest 20.

Figure 7:
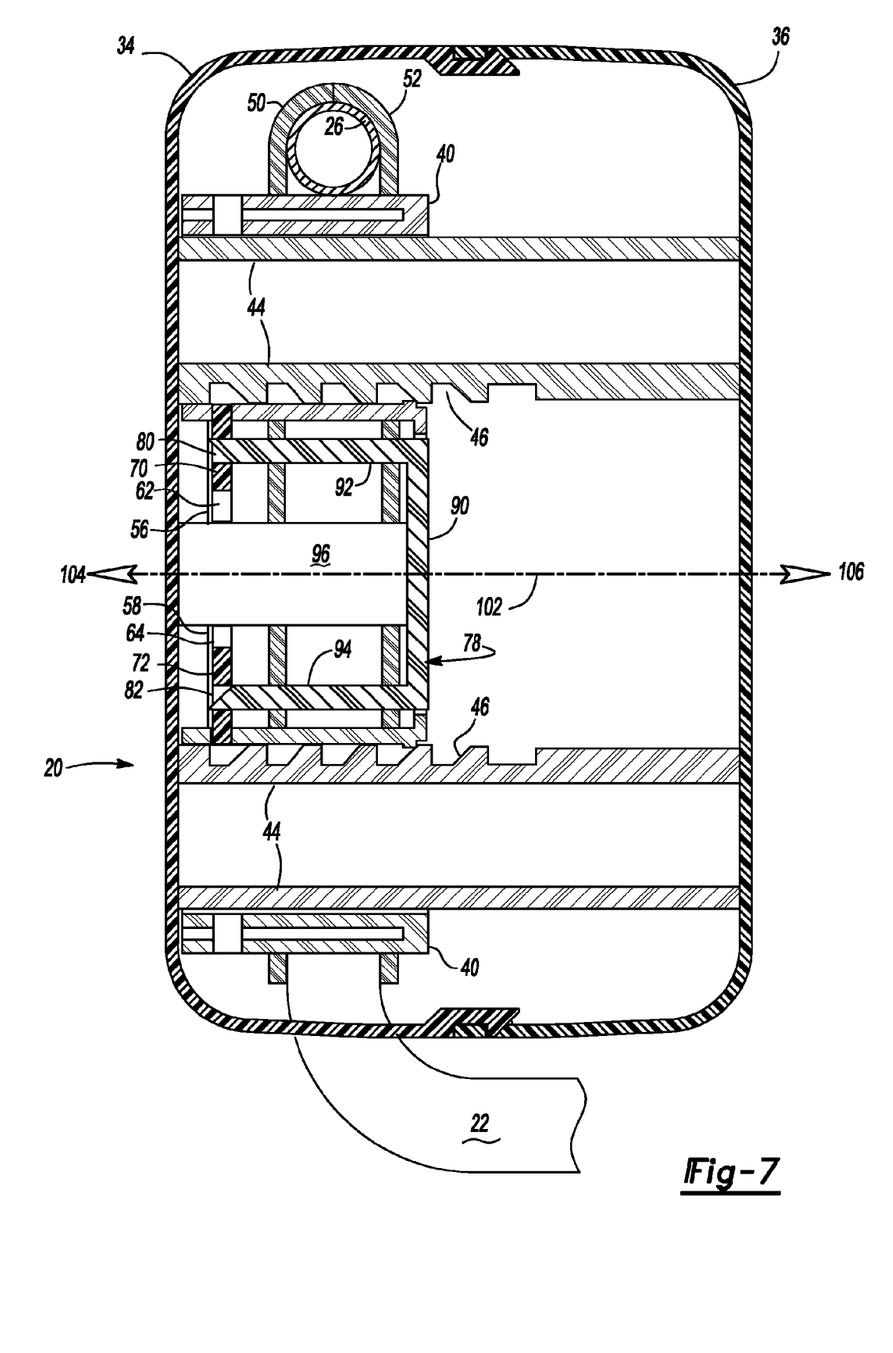

In FIG. 7, the headrest 20 is shown prior to release of the lock device 78. The headrest 20 has been moved in the second direction 106 such that the release arms 96 on the lock device 78 engage the first housing 34. Further movement of the headrest 20 in the second direction causes the headrest 20 to move to the position shown in FIG. 8.

Figure 8:
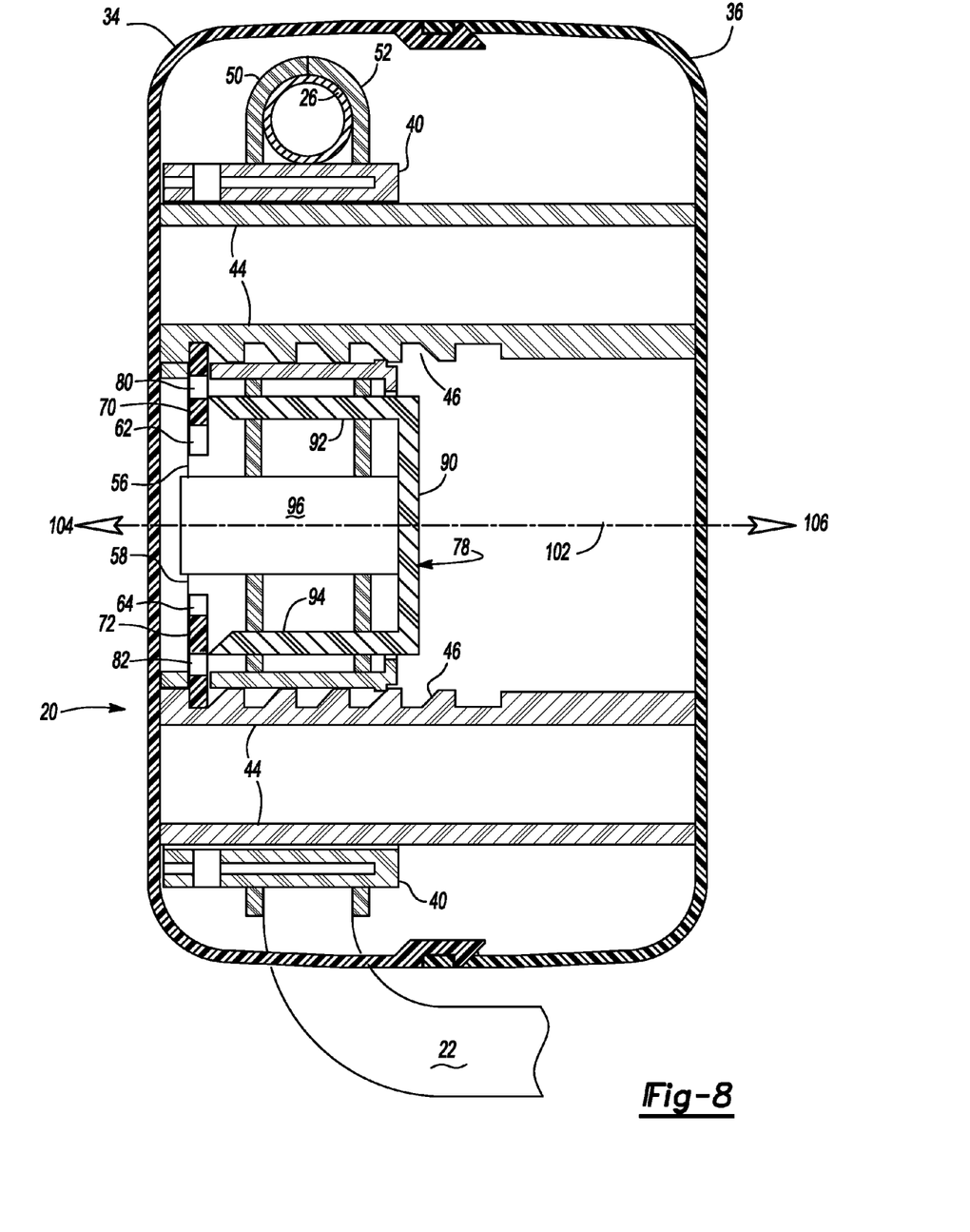

In FIG. 8, force exerted by the first housing 34 on the release arms 96 causes the lock device 78 to move in the second direction 106 (i.e., to the right) such that the first and second latch engagement arms 92, 94 move out of the first and second holes 80, 82. The first and second latches 70, 72 are then free to move into engagement with an associated notch 46 under the biasing force exerted by the first and second biasing members, 74, 76, respectively.

The headrest 20 may be moved from the position shown in FIG. 8 in the first direction 104 when sufficient force is applied to the headrest 20. For instance, an actuation force in the first direction may cause the first and second latches 70, 72 to move out of engagement with one notch 46 and into engagement with an adjacent notch. The first and second latches 70, 72 may slide along the ramp surface of one notch 46 and into engagement with the next notch in a ratchet-like manner. Movement of the headrest 20 in the second direction 106 is inhibited until the lock device 78 is moved to the locked position as previously described.

Actuation in the first and/or second directions may occur in response to a sufficient actuation force provided to the headrest 20. The actuation force may or may not be due to manually applied forces or intervention. For instance, a seat occupant may exert an actuation force on the headrest 20 to move the headrest 20 in the second direction by pulling the headrest 20 closer to the head of the occupant. Alternatively, the headrest 20 may be configured to move in response to inertial forces, such as may occur during a vehicle impact event.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A seat assembly comprising:
a seat back; and
a head restraint assembly disposed on the seat back, the head restraint assembly including:
    a support post; and
    a headrest disposed on the support post, wherein the headrest has a mounting unit that receives the support post, first and second housings that are disposed under a trim cover and that receive the mounting unit and move with respect to the mounting unit and support post, and a lock device that extends through the mounting unit, wherein the lock device includes a latch engagement arm and a release arm that both extend toward the first housing from a base and that do not move with respect to each other, wherein force exerted by the first housing on the release arm moves the lock device toward the second housing to an unlocked position in which the latch engagement arm disengages a latch and wherein force exerted by the second housing on the base moves the lock device toward the first housing to a locked position;
wherein the headrest is inhibited from moving away from a head of a seat occupant until the headrest is actuated toward the head of the seat occupant.

2. The seat assembly of claim 1 wherein the lock device moves between the locked position in which headrest is permitted to move away from the head of the seat occupant and the unlocked position.

3. The seat assembly of claim 1 wherein the lock device permits movement of the headrest toward the head of the seat occupant when a sufficient actuation force is applied to the head restraint assembly.

4. The seat assembly of claim 1 wherein the latch has a hole, wherein the latch engagement arm is disposed in the hole in the locked position and the latch engagement arm is spaced apart from the hole in the unlocked position.

5. The seat assembly of claim 2 wherein the first housing engages the lock device to move the lock device to the unlocked position and wherein the second housing engages the lock device to move the lock device to the locked position.

6. The seat assembly of claim 5 wherein the release arm is longer than the latch engagement arm and engages the first housing to move the locked device from the locked position to the unlocked position.

7. The seat assembly of claim 1 wherein the mounting unit has a latch mounting feature that receives the latch.

8. The seat assembly of claim 1 wherein the headrest further comprises a sleeve fixedly disposed on the mounting unit and having a sleeve opening and an engagement member that extends through the sleeve and has a set of notches, wherein the latch engages a member of the set of notches to inhibit movement of the headrest.

9. The seat assembly of claim 8 wherein the sleeve opening receives the latch when the latch engages a member of the set of notches.

10. A seat assembly comprising:
a seat back; and
a head restraint assembly disposed on the seat back, the head restraint assembly including:
    a support post; and
    a headrest disposed on the support post and configured to move along an axis, wherein the headrest has a mounting unit that receives the support post, first and second housings that receive the mounting unit, and a lock device that extends through slots in the mounting unit;
wherein the headrest is inhibited from moving along the axis in a first direction until the headrest is moved along the axis in a second direction disposed opposite the first direction to actuate the lock device along the axis in the first direction to engage the first housing to release a latching mechanism and wherein the lock device does not engage the first and second housings when the headrest is disposed between a forward position and a rearward position.

11. The seat assembly of claim 10 wherein the first direction extends toward a head of a seat occupant and the second direction extends away from the head of the seat occupant.

12. The seat assembly of claim 10 wherein the mounting unit is disposed on the support post and a latching mechanism is disposed on the mounting unit.

13. The seat assembly of claim 12 wherein the mounting unit includes first and second latch mounting features that receive first and second latches, respectively.

14. The seat assembly of claim 13 further comprising first and second latch biasing members that bias the first and second latches in opposite directions.

15. The seat assembly of claim 14 wherein the mounting unit includes a divider wall disposed between the first and second latch mounting features, wherein the first and second latch biasing members engage the divider wall.

16. The seat assembly of claim 13 wherein the mounting unit includes a lock opening that receives the lock device and is disposed between the first and second latches.

17. The seat assembly of claim 16 wherein the first and second latches include first and second holes, respectively, wherein movement of the first and second latches is inhibited when the lock device is disposed in the first and second holes.

18. The seat assembly of claim 16 wherein the lock device moves in the first direction when engaged by the second housing of the headrest and moves in the second direction when engaged by the first housing of the headrest.

19. A seat assembly comprising:
a seat back;
a support post extending from the seat back; and
a headrest configured to move with respect to the support post in a first direction and in a second direction disposed opposite the first direction, the headrest including:
first and second housings that are disposed under a trim cover and fixedly disposed with respect to each other and move with respect to the support post;
an engagement member that is spaced apart from the trim cover and that extends from the first housing to the second housing, the engagement member having a set of notches; and
a latching mechanism having a latch that engages a member of the set of notches to inhibit movement of the headrest in the first direction and a lock device that is spaced apart from the engagement member and moves from an unlocked position in which the lock device is disengaged from the latch to an engaged position in which the lock device engages the latch to permit movement of the headrest in the first direction.

20. The seat assembly of claim 19 further comprising a housing biasing member that biases the headrest in the second direction.

* * * * *